US011567372B2

(12) United States Patent
Zhu

(10) Patent No.: US 11,567,372 B2
(45) Date of Patent: Jan. 31, 2023

(54) TFT-LCD DEVICE

(71) Applicant: TCL CHINA STAR OPTOELECTRONICS TECHNOLOGY CO., LTD., Shenzhen (CN)

(72) Inventor: Qingyong Zhu, Shenzhen (CN)

( * ) Notice: Subject to any disclaimer, the term of this patent is extended or adjusted under 35 U.S.C. 154(b) by 202 days.

(21) Appl. No.: 16/761,249

(22) PCT Filed: Mar. 19, 2020

(86) PCT No.: PCT/CN2020/080168
§ 371 (c)(1),
(2) Date: May 3, 2020

(87) PCT Pub. No.: WO2021/168943
PCT Pub. Date: Sep. 2, 2021

(65) Prior Publication Data

US 2022/0107521 A1 Apr. 7, 2022

(30) Foreign Application Priority Data

Feb. 25, 2020 (CN) ......................... 202010116052.0

(51) Int. Cl.

| | |
|---|---|
| ***G02F 1/1339*** | (2006.01) |
| ***G02F 1/1335*** | (2006.01) |
| ***G02F 1/1337*** | (2006.01) |
| ***G02F 1/1368*** | (2006.01) |
| ***G02F 1/1333*** | (2006.01) |
| ***G02F 1/1362*** | (2006.01) |

(52) U.S. Cl.
CPC .......... *G02F 1/1339* (2013.01); *G02F 1/1368* (2013.01); *G02F 1/133514* (2013.01); *G02F 1/133723* (2013.01); *G02F 1/133357* (2021.01); *G02F 1/133512* (2013.01); *G02F 1/136286* (2013.01); *G02F 2202/28* (2013.01)

(58) Field of Classification Search
None
See application file for complete search history.

(56) References Cited

U.S. PATENT DOCUMENTS

2009/0147204 A1* 6/2009 Kang .................. G02F 1/13452 349/150
2010/0091231 A1* 4/2010 Nishimura ........ G02F 1/134363 349/139
2013/0235310 A1 9/2013 Tang
2017/0123244 A1* 5/2017 Oh .................... G02F 1/133345
2017/0160611 A1* 6/2017 Xu .................... G02F 1/136227
(Continued)

FOREIGN PATENT DOCUMENTS

CN 101082711 A 12/2007
CN 102591074 A 7/2012
(Continued)

*Primary Examiner* — Shan Liu

(57) ABSTRACT

The disclosure provides a liquid crystal display (LCD) device including a display area and a non-display area, a bonding area is further disposed in the non-display area, a bonding lead is formed on an array substrate in the bonding area, and a first alignment film is further disposed on the array substrate. A dam is disposed on a side of the bonding lead near an edge of the display area, and the first dam is configured to isolate the first alignment film from the bonding lead.

17 Claims, 3 Drawing Sheets

91
80
31

(56) References Cited

U.S. PATENT DOCUMENTS

2019/0304921 A1* 10/2019 Kuroe ................. H01L 27/1218
2021/0141264 A1* 5/2021 Shin ...................... G02F 1/1339

FOREIGN PATENT DOCUMENTS

CN 106501983 A * 3/2017 ........... G02F 1/1333
CN 106501983 A 3/2017
CN 107329336 A * 11/2017 ........... G02F 1/1345
CN 107632434 A * 1/2018
CN 107632434 A 1/2018
CN 109828399 A * 5/2019
JP 2007079211 A 3/2007

* cited by examiner

TFT-LCD DEVICE

FIELD

The present disclosure relates to the field of display technologies, and more particularly, relates to a liquid crystal display (LCD) device.

BACKGROUND

In thin film transistor liquid crystal displays (TFT-LCDs), a printed circuit board (PCB) and a liquid crystal panel are commonly attached to each other by a chip on film (COF) substrate, allowing the PCB to output control signals to the liquid crystal panel, thereby driving and controlling the TFT-LCDs. An end of the COF substrate is bonded to a bonding lead, and another end of the COF substrate is connected to the PCB.

In conventional LCD devices, an alignment film is disposed on a side of an array substrate. The alignment film may provide a tilt angle for liquid crystal molecules, so that the liquid crystal molecules can be arranged orderly. An inkjet printing process is commonly used to manufacture alignment films and has advantages such as high efficiency and high usage. In a process of manufacturing alignment films by inkjet printing, an edge of ink may uncontrollably expand, reducing precision. Typically, a distance between a wavy-shaped edge of an alignment film and a display area of a substrate ranges from 1200 μm to 2400 μm. However, for those narrow-frame products with a frame narrower than 2.4 mm, there is a risk that a bonding lead may be completely covered by an alignment film manufactured by an inkjet printing process. Because the alignment film is made of an insulating material, conductivity between a COF substrate and a bonding lead may be poor if the alignment film covers the bonding lead, leading to display abnormality.

As a result, it is necessary to develop an LCD device to solve the above problem.

Regarding the technical problem: in conventional LCD devices, for those narrow-frame products with a frame narrower than 2.4 mm, there is a risk that a bonding lead may be completely covered by an alignment film manufactured by an inkjet printing process. Because the alignment film is made of an insulating material, conductivity between a COF substrate and a bonding lead may be poor if the alignment film covers the bonding lead, leading to display abnormality.

SUMMARY

In a first aspect, an embodiment of the present disclosure provides a liquid crystal display (LCD) device, including: an array substrate and a color filter substrate, which are disposed opposite to each other; and a liquid crystal layer and a plurality of photo spacers, which are disposed between the array substrate and the color filter substrate. The array substrate is adhered to the color filter substrate by a frame sealant. The LCD device includes a display area and a non-display area disposed outside the display area, and a bonding area is further defined in the non-display area. A bonding lead is formed on the array substrate in the bonding area, and a first alignment film is further disposed on the array substrate.

A first dam is disposed on a side of the bonding lead near an edge of the display area, the first dam is configured to isolate the first alignment film from the bonding lead and has a curved convex structure, and a convex direction of the curved convex structure points to the first alignment film.

In the LCD device provided by an embodiment of the present disclosure, a height of the curved convex structure ranges from 2 μm to 4 μm, and a width of an arc of the curved convex structure ranges from 5 μm to 50 μm.

In the LCD device provided by an embodiment of the present disclosure, the array substrate includes a first substrate and a plurality of thin film transistor (TFT) array layers disposed on the first substrate, and the TFT array layers include a buffer layer, a gate metal layer, a gate insulating layer, an interlayer insulating layer, a source/drain metal layer, a pixel electrode layer, a planarization layer, and a passivation layer.

In the LCD device provided by an embodiment of the present disclosure, the color filter substrate includes a second substrate, a color film, a common electrode layer, and a second alignment film.

In the LCD device provided by an embodiment of the present disclosure, a material of the first alignment film and a material of the second alignment film are polyimide.

In the LCD device provided by an embodiment of the present disclosure, the color filter includes a color filter layer and a plurality of black matrices, the color filter layer includes a plurality of red color resists, green color resists, and blue color resists, and the black matrices are disposed between any two of the red color resists, green color resists, and blue color resists.

In the LCD device provided by an embodiment of the present disclosure, a material of the first dam is same as a material of any one of the photo spacers, the red color resists, green color resists, and blue color resists, the gate metal layer, the source/drain metal layer, and the planarization layer.

In the LCD device provided by an embodiment of the present disclosure, the LCD device further includes a chip on film (COF) substrate, an end of the COF substrate is adhered to the bonding lead by a first adhesive layer, and another end of the COF substrate is adhered to a printed circuit board by the first adhesive layer.

In the LCD device provided by an embodiment of the present disclosure, the first adhesive layer is an anisotropic conductive adhesive.

In a second aspect, the present disclosure further provides a liquid crystal display (LCD) device, including: an array substrate and a color filter substrate, which are disposed opposite to each other; and a liquid crystal layer and a plurality of photo spacers, which are disposed between the array substrate and the color filter substrate. The array substrate is adhered to the color filter substrate by a frame sealant. The LCD device includes a display area and a non-display area disposed outside the display area, and a bonding area is further defined in the non-display area. A bonding lead is formed on the array substrate in the bonding area, and a first alignment film is further disposed on the array substrate.

A first dam is disposed on a side of the bonding lead near an edge of the display area, and the first dam is configured to isolate the first alignment film from the bonding lead.

In the LCD device provided by an embodiment of the present disclosure, the array substrate includes a first substrate and a plurality of thin film transistor (TFT) array layers disposed on the first substrate, and the TFT array layers include a buffer layer, a gate metal layer, a gate insulating layer, an interlayer insulating layer, a source/drain metal layer, a pixel electrode layer, a planarization layer, and a passivation layer.

In the LCD device provided by an embodiment of the present disclosure, the color filter substrate includes a second substrate, a color film, a common electrode layer, and a second alignment film.

In the LCD device provided by an embodiment of the present disclosure, a material of the first alignment film and a material the second alignment film are polyimide.

In the LCD device provided by an embodiment of the present disclosure, the color filter includes a color filter layer and a plurality of black matrices, the color filter layer includes a plurality of red color resists, green color resists, and blue color resists, and the black matrices are disposed between any two of the red color resists, green color resists, and blue color resists.

In the LCD device provided by an embodiment of the present disclosure, a material of the first dam is same as a material of any one of the photo spacers, the red color resists, green color resists, and blue color resists, the gate metal layer, the source/drain metal layer, and the planarization layer.

In the LCD device provided by an embodiment of the present disclosure, the LCD device further includes a chip on film (COF) substrate, an end of the COF substrate is adhered to the bonding lead by a first adhesive layer, and another end of the COF substrate is adhered to a printed circuit board by the first adhesive layer.

In the LCD device provided by an embodiment of the present disclosure, the first adhesive layer is an anisotropic conductive adhesive.

Regarding the beneficial effects: compared with conventional technologies, in an LCD device provided by an embodiment of the present disclosure, a dam structure is disposed between an alignment film on an array substrate and a bonding lead. Therefore, a poor conductivity between a COF substrate and the bonding lead due to ink of the alignment film covering the bonding lead is prevented, and display effect of the LCD device is further improved without adding an additional process.

DETAILED DESCRIPTION

Figure 1:
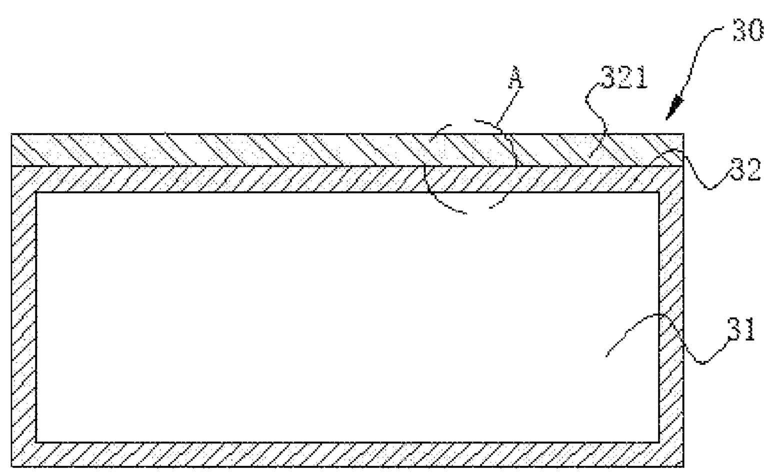
FIG. 1 is a schematic plan view showing an LCD device provided by an embodiment of the present disclosure.

As shown in FIG. 1, a plan view showing an LCD device 30 according to an embodiment of the present disclosure is provided. The LCD device 30 includes a display area 31 and a non-display area 32 disposed outside the display area 31, and a bonding area 321 is further disposed in the non-display area 32.

Figure 2:
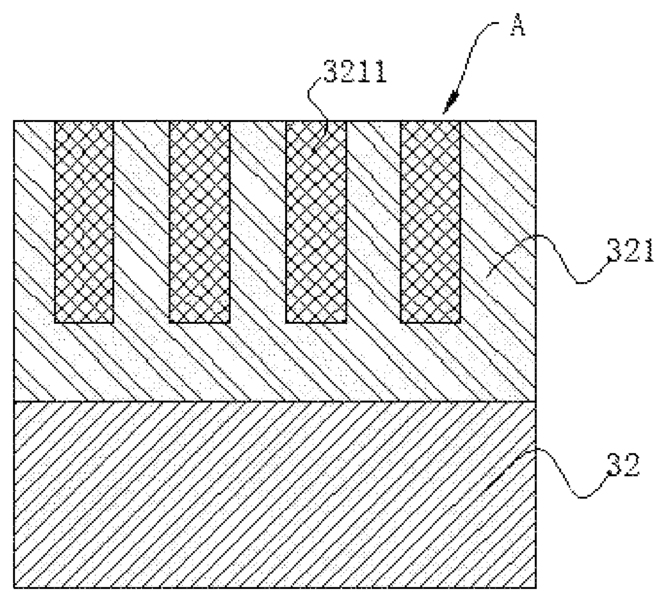
FIG. 2 is a partially enlarged view showing part A in FIG. 1.

Specifically, as shown in FIG. 2, a partially enlarged view showing part A in FIG. 1 is provided. A bonding lead 3211 is further disposed in the bonding area 321.

Figure 3:
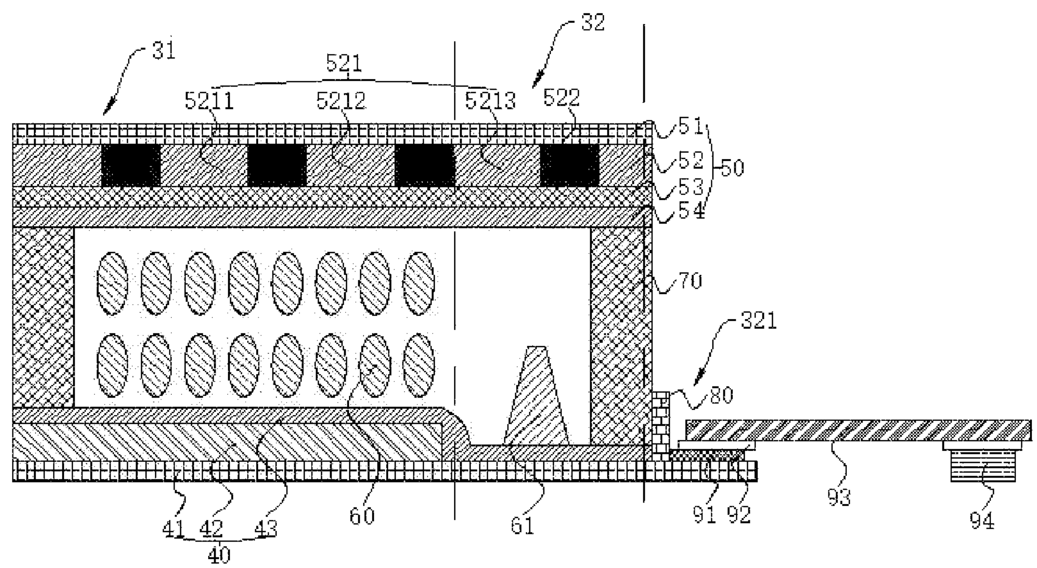
FIG. 3 is a schematic sectional view showing an LCD device provided by an embodiment of the present disclosure.

As shown in FIG. 3, a schematic sectional view showing an LCD device provided according to an embodiment of the present disclosure is provided. The LCD device includes an array substrate 40 and a color filter substrate 50, which are disposed opposite to each other and are parallel to each other, and a liquid crystal layer 60 disposed between the array substrate 40 and the color filter substrate 50. Two ends of a periphery of the array substrate 40 are adhered to two ends of a periphery of the color filter substrate 50 by a frame sealant 70. The LCD device further includes a display area 31 and a non-display area 32 disposed outside the display area 31, and a bonding area 321 is further disposed in the non-display area 32. A bonding lead 91 is formed on the array substrate 40 in the bonding area 321, and a first alignment film 43 is further disposed on the array substrate 40.

A first dam 80 is disposed on a side of the bonding lead 91 near an edge of the display area 31, and the first dam 80 is configured to isolate the first alignment film 43 from the bonding lead 91.

Specifically, a plurality of photo spacers 61 are further disposed between the array substrate 40 and the color filter substrate 50, wherein the photo spacers 61 are formed on a side of the array substrate 40 and may be made of polyimide by an etching method or a printing method.

Specifically, the array substrate 40 further includes a first substrate 41 and a plurality of thin film transistor (TFT) layers 42 disposed thereon. The TFT layers 42 include a buffer layer, a gate metal layer, a gate insulating layer, an interlayer insulating layer, a source/drain metal layer, a pixel electrode layer, a planarization layer, and a passivation layer, which are not shown in drawings.

Specifically, the color filter substrate 50 sequentially includes a second substrate 51, a color film 52, a common electrode layer 53, and a second alignment layer 54 (from top to bottom). The color film 52 includes a color filter layer 521 and a plurality of black matrices 522. The color filter layer 521 includes a plurality of red color resists 5211, a plurality of green color resists 5212, a plurality of blue color resists 5213, and the black matrices 522 disposed between any two of the red color resists 5211, the green color resists 5212, and the blue color resists 5213.

Specifically, the LCD device is disposed in the bonding area 321 and further includes a chip on film (COF) substrate 93. An end of the COF substrate 93 is adhered to the bonding lead 91 by a first adhesive layer 92, and another end of the COF substrate 93 is adhered to a printed circuit board (PCB) by the first adhesive layer 92, allowing the PCB 94 to output driving control signals to an LCD panel, thereby driving and controlling the LCD panel. The first adhesive layer 92 consists of an anisotropic conductive film (ACF).

Specifically, the liquid crystal layer 60 includes a plurality of liquid crystal molecules, a plurality of photoinitiators, and a plurality of polymerizable monomers that can be polymerized by irradiating with ultraviolet (UV) light. The liquid crystal molecules are nematic liquid crystal molecules with negative dielectric anisotropy.

Specifically, the frame sealant 70 may effectively adhere the array substrate 40 to the color filter substrate 50. The frame sealant 70 is formed by a UV light curing process and a thermal curing process.

Figure 4:
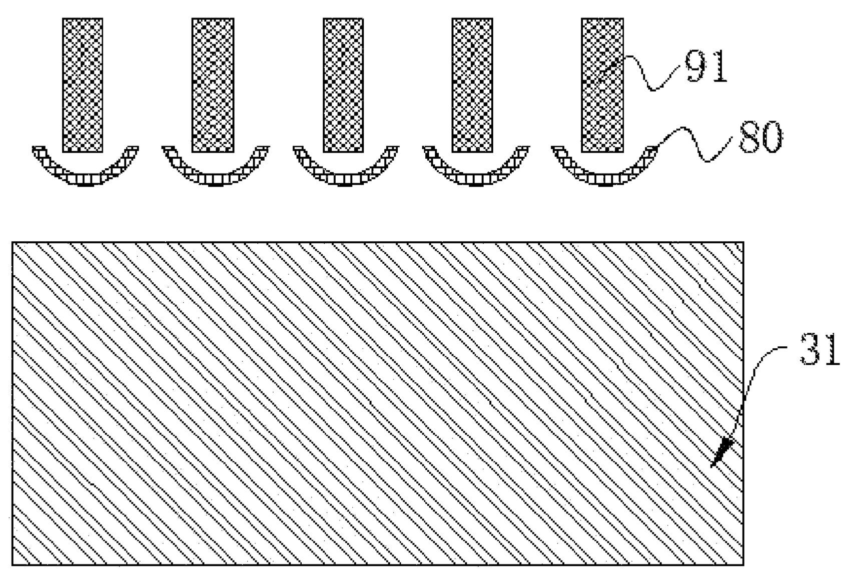
FIG. 4 is a schematic plan view showing an area where a first dam is disposed in FIG. 3.

As shown in FIG. 4, a schematic plan view showing an area where the first dam 80 is disposed in FIG. 3 is provided. The first dam 80 has a curved convex structure, and a convex direction of the curved convex structure points to the first alignment film 43. The ink used to form the first alignment film 43 may bypass a circular through hole because of surface tension of the ink. Therefore, the first dam 80 with the curved convex structure may allow the ink of the first alignment film 43 to easily diffuse along a tangent direction of an arc of the curved convex structure, thereby preventing the bonding lead 91 from being covered by the ink of the first alignment film 43.

Specifically, a material of the first alignment film 43 and a material of the second alignment film 54 are polyimide. Both the first alignment layer 43 and the second alignment layer 54 are formed using an inkjet printing process with polyimide ink. Preferably, the first alignment film 43 and the second alignment film 54 are vertical alignment films. Furthermore, both the first alignment film 43 and the second alignment film 54 are photo alignment film. A tilt angle is formed when the photo alignment film is irradiated with UV light, thereby realizing a consistent orientation of the liquid crystal molecules.

Specifically, a material of the first dam 80 is same as a material of any one of the photo spacers 61, the red color resists 5211, the green color resists 5212, the blue color resists 5213, the gate metal layer, the source/drain metal layer, and the planarization layer.

A curved exposure area is defined on a side of the bonding lead 91 near the display area 31. Then, normal processes, such as exposure and development, are performed on the curved exposure area to form the dam 80 with the curved convex structure, and no additional process needs to be added.

Specifically, a height of the curved convex structure and a width of an arc of the curved convex structure may be precisely decided according to an actual process. Preferably, a height of the curved convex structure ranges from 2 μm to 4 μm, and a width of an arc of the curved convex structure ranges from 5 μm to 50 μm.

In the LCD device provided by the present embodiment of the present disclosure, only a frame design is changed, and no additional process needs to be added. Therefore, the display area 31 will not be affected.

Specific applications may be referred to the above embodiments and are not described here.

In summary, in an LCD device provided by an embodiment of the present disclosure, a dam structure is disposed between an alignment film on an array substrate and a bonding lead. Therefore, a poor conductivity between a COF substrate and the bonding lead due to ink of the alignment film covering the bonding lead is prevented, and display effect of the LCD device is further improved without adding any additional process.

It should be noted that many changes and modifications to the described embodiment can be carried out by those skilled in the art, and all such changes and modifications are intended to be included within the scope of the appended claims.

What is claimed is:

1. A liquid crystal display (LCD) device, comprising:

an array substrate and a color filter substrate, which are disposed opposite to each other; and a liquid crystal layer and a plurality of photo spacers, which are disposed between the array substrate and the color filter substrate;

wherein the array substrate is adhered to the color filter substrate by a frame sealant, the LCD device comprises a display area and a non-display area disposed outside the display area, a bonding area is further defined in the non-display area, a plurality of bonding leads are formed on the array substrate in the bonding area, and a first alignment film is further disposed on the array substrate; and wherein a plurality of first dams are disposed on a side of the bonding leads near an edge of the display area, the first dams are configured to isolate the first alignment film from the bonding leads, each of the first dams is protruded from a top surface of the array substrate with a material same as a material of the photo spacers and is a curved convex structure with a circular arc shape, a convex direction of the curved convex structure points to the first alignment film, the first dams and the bonding leads are in a one-to-one correspondence, each of the first dams corresponds to one of the bonding leads, and a gap is defined between two adjacent first dams.

2. The LCD device of claim 1, wherein a height of the curved convex structure ranges from 2 μm to 4 μm, and a width of an arc of the curved convex structure ranges from 5 μm to 50 μm.

3. The LCD device of claim 1, wherein the array substrate comprises a first substrate and a plurality of thin film transistor (TFT) array layers disposed on the first substrate, and the TFT array layers comprise a buffer layer, a gate metal layer, a gate insulating layer, an interlayer insulating layer, a source/drain metal layer, a pixel electrode layer, a planarization layer, and a passivation layer.

4. The LCD device of claim 3, wherein a material of the first dams is same as a material of any one of the photo spacers, the red color resists, green color resists, and blue color resists, the gate metal layer, the source/drain metal layer, and the planarization layer.

5. The LCD device of claim 1, wherein the color filter substrate comprises a second substrate, a color film, a common electrode layer, and a second alignment film.

6. The LCD device of claim 5, wherein a material of the first alignment film and a material of the second alignment film are polyimide.

7. The LCD device of claim 5, wherein the color filter comprises a color filter layer and a plurality of black matrices, the color filter layer comprises a plurality of red color resists, green color resists, and blue color resists, and the black matrices are disposed between any two of the red color resists, green color resists, and blue color resists.

8. The LCD device of claim 1, wherein the LCD device further comprises a chip on film (COF) substrate, an end of the COF substrate is adhered to the bonding leads by a first adhesive layer, and another end of the COF substrate is adhered to a printed circuit board by the first adhesive layer.

9. The LCD of claim 8, wherein the first adhesive layer is an anisotropic conductive adhesive.

10. A liquid crystal display (LCD) device, comprising:

an array substrate and a color filter substrate, which are disposed opposite to each other; and a liquid crystal layer and a plurality of photo spacers, which are disposed between the array substrate and the color filter substrate;

wherein the array substrate is adhered to the color filter substrate by a frame sealant, the LCD device comprises a display area and a non-display area disposed outside the display area, a bonding area is further defined in the non-display area, a plurality of bonding leads are formed on the array substrate in the bonding area, and a first alignment film is further disposed on the array substrate; and wherein a plurality of first dams are disposed on a side of the bonding leads near an edge of the display area, the first dams are configured to isolate the first alignment film from the bonding leads and have a curved convex structure, the first dams and the bonding leads are in a one-to-one correspondence, and each of the first dams corresponds to one of the bonding leads, and a gap is defined between two adjacent first dams.

11. The LCD device of claim 10, wherein the array substrate comprises a first substrate and a plurality of thin film transistor (TFT) array layers disposed on the first substrate, and the TFT array layers comprise a buffer layer, a gate metal layer, a gate insulating layer, an interlayer insulating layer, a source/drain metal layer, a pixel electrode layer, a planarization layer, and a passivation layer.

12. The LCD device of claim 11, wherein a material of the first dams is same as a material of any one of the photo spacers, the red color resists, green color resists, and blue color resists, the gate metal layer, the source/drain metal layer, and the planarization layer.

13. The LCD device of claim 10, wherein the color filter substrate comprises a second substrate, a color film, a common electrode layer, and a second alignment film.

14. The LCD device of claim 13, wherein a material of the first alignment film and a material of the second alignment film are polyimide.

15. The LCD device of claim 13, wherein the color filter comprises a color filter layer and a plurality of black matrices, the color filter layer comprises a plurality of red color resists, green color resists, and blue color resists, and the black matrices are disposed between any two of the red color resists, green color resists, and blue color resists.

16. The LCD device of claim 10, wherein the LCD device further comprises a chip on film (COF) substrate, an end of the COF substrate is adhered to the bonding leads by a first adhesive layer, and another end of the COF substrate is adhered to a printed circuit board by the first adhesive layer.

17. The LCD device of claim 16, wherein the first adhesive layer is an anisotropic conductive adhesive.

* * * * *